(12) United States Patent
Landman

(10) Patent No.: US 11,533,331 B2
(45) Date of Patent: *Dec. 20, 2022

(54) SOFTWARE RELEASE TRACKING AND LOGGING

(71) Applicant: JFrog Ltd., Netanya (IL)

(72) Inventor: Yoav Landman, Netanya (IL)

(73) Assignee: JFrog Ltd., Netanya (IL)

( * ) Notice: Subject to any disclaimer, the term of this patent is extended or adjusted under 35 U.S.C. 154(b) by 82 days.

This patent is subject to a terminal disclaimer.

(21) Appl. No.: 17/227,069

(22) Filed: Apr. 9, 2021

(65) Prior Publication Data

US 2021/0234887 A1 Jul. 29, 2021

Related U.S. Application Data

(63) Continuation of application No. 16/931,898, filed on Jul. 17, 2020, now Pat. No. 10,999,314.

(60) Provisional application No. 62/876,562, filed on Jul. 19, 2019.

(51) Int. Cl.
| | |
|---|---|
| *H04L 29/06* | (2006.01) |
| *G06F 8/65* | (2018.01) |
| *H04L 9/40* | (2022.01) |

(52) U.S. Cl.
CPC ............ *H04L 63/1433* (2013.01); *G06F 8/65* (2013.01); *H04L 63/20* (2013.01)

(58) Field of Classification Search
CPC ........ H04L 63/1433; H04L 63/20; G06F 8/65
See application file for complete search history.

(56) References Cited

U.S. PATENT DOCUMENTS

| | | | |
|---|---|---|---|
| 5,671,282 | A | 9/1997 | Wolff et al. |
| 5,915,238 | A | 6/1999 | Tjaden |
| 5,931,946 | A * | 8/1999 | Terada ................ H04L 63/1433 726/25 |
| 6,604,236 | B1 | 8/2003 | Draper et al. |
| 7,007,042 | B2 | 2/2006 | Lubbers et al. |
| 8,036,140 | B2 | 10/2011 | Rao et al. |
| 8,196,186 | B2 | 6/2012 | Mityagin et al. |

(Continued)

FOREIGN PATENT DOCUMENTS

WO WO-2012153173 A2 11/2012

OTHER PUBLICATIONS

Patent Cooperation Treaty, International Search Report and Written Opinion issued for PCT Application No. PCT/IB2020/056777, dated Oct. 19, 2020, 15 pages.

(Continued)

*Primary Examiner* — Mohammed Waliullah
(74) *Attorney, Agent, or Firm* — Norton Rose Fulbright US LLP

(57) ABSTRACT

The present disclosure provides a method, system, and device for securely updating a software release across a network. To illustrate, a server may compile a transaction log that includes information corresponding to one or more nodes in the network to which the software release has been transmitted. The server may analyze one or more files based on vulnerability information to identify at least one file of the one or more files that poses a risk. The server may also identify at least one node of the network at which the at least one file is deployed. Based on identifying the at least one node, the server may transmit a corrective action with respect to the at least one node.

23 Claims, 6 Drawing Sheets

(56) References Cited

U.S. PATENT DOCUMENTS

| | | | |
|---|---|---|---|
| 8,364,758 B2 | 1/2013 | Hydrie et al. | |
| 9,053,124 B1 | 6/2015 | Domquast et al. | |
| 9,280,339 B1 | 3/2016 | Prunicki et al. | |
| 9,635,107 B2 | 4/2017 | Souza et al. | |
| 9,659,155 B2 | 5/2017 | Kosovan | |
| 9,842,062 B2 | 12/2017 | Ford et al. | |
| 10,091,215 B1 | 10/2018 | Word | |
| 10,339,299 B1 | 7/2019 | Magnuson et al. | |
| 10,387,570 B2 | 8/2019 | VanBlon et al. | |
| 10,409,838 B1 | 9/2019 | George et al. | |
| 10,719,369 B1 | 7/2020 | Aithal et al. | |
| 10,754,952 B2 | 8/2020 | Muller et al. | |
| 10,911,337 B1 | 2/2021 | De Kosnik et al. | |
| 10,986,387 B1 | 4/2021 | Parulkar et al. | |
| 11,048,590 B1 | 6/2021 | Sapuntzakis et al. | |
| 11,064,323 B2 | 7/2021 | Esselink et al. | |
| 11,284,258 B1 | 3/2022 | Wei et al. | |
| 2002/0156893 A1 | 10/2002 | Pouyoul et al. | |
| 2003/0220880 A1* | 11/2003 | Lao | H04L 63/20 705/51 |
| 2004/0181561 A1 | 9/2004 | Knox et al. | |
| 2004/0250115 A1* | 12/2004 | Gemmel | G06F 21/57 726/24 |
| 2005/0132348 A1 | 6/2005 | Meulemans et al. | |
| 2007/0294686 A1 | 12/2007 | Oh | |
| 2008/0005113 A1 | 1/2008 | Li | |
| 2008/0005120 A1 | 1/2008 | Li | |
| 2008/0082648 A1 | 4/2008 | Ahmed et al. | |
| 2008/0294860 A1 | 11/2008 | Stakutis et al. | |
| 2009/0013317 A1* | 1/2009 | Abfalter | G06F 8/65 717/170 |
| 2009/0083812 A1 | 3/2009 | Tang | |
| 2009/0119655 A1 | 5/2009 | Quilty | |
| 2009/0210697 A1 | 8/2009 | Chen et al. | |
| 2010/0217694 A1 | 8/2010 | Knighton | |
| 2011/0010421 A1 | 1/2011 | Chavez et al. | |
| 2011/0107419 A1* | 5/2011 | Vidal | G06F 21/577 726/22 |
| 2011/0113012 A1 | 5/2011 | Gruhl et al. | |
| 2011/0225311 A1 | 9/2011 | Liu et al. | |
| 2011/0307564 A1 | 12/2011 | Luo et al. | |
| 2012/0131566 A1 | 5/2012 | Morgan et al. | |
| 2012/0151245 A1 | 6/2012 | Chang et al. | |
| 2012/0233134 A1 | 9/2012 | Barton et al. | |
| 2012/0240096 A1* | 9/2012 | Sass | G06F 8/75 717/101 |
| 2012/0297405 A1 | 11/2012 | Zhang et al. | |
| 2013/0073727 A1 | 3/2013 | Souza et al. | |
| 2013/0081100 A1 | 3/2013 | Sreehari et al. | |
| 2013/0132946 A1 | 5/2013 | Ma | |
| 2013/0268927 A1 | 10/2013 | Cochran | |
| 2014/0172972 A1 | 6/2014 | Burba et al. | |
| 2014/0245376 A1* | 8/2014 | Hibbert | H04L 63/20 726/1 |
| 2015/0003296 A1 | 1/2015 | Fan et al. | |
| 2015/0088992 A1 | 3/2015 | Ioannidis et al. | |
| 2015/0268881 A1 | 9/2015 | Nielsen et al. | |
| 2015/0301823 A1 | 10/2015 | Hatakeyama | |
| 2015/0302037 A1 | 10/2015 | Jackson et al. | |
| 2015/0312243 A1 | 10/2015 | Ponsford et al. | |
| 2015/0317145 A1 | 11/2015 | Katariya et al. | |
| 2016/0117235 A1 | 4/2016 | Mishra et al. | |
| 2016/0124665 A1 | 5/2016 | Jain et al. | |
| 2016/0164900 A1 | 6/2016 | Pericin | |
| 2016/0179867 A1 | 6/2016 | Li et al. | |
| 2016/0182494 A1 | 6/2016 | Lissounov et al. | |
| 2016/0234237 A1* | 8/2016 | Thakar | H04L 63/1433 |
| 2016/0266890 A1 | 9/2016 | Aleksandrov et al. | |
| 2016/0267101 A1 | 9/2016 | Clissold et al. | |
| 2017/0003951 A1 | 1/2017 | Newell et al. | |
| 2017/0034023 A1 | 2/2017 | Nickolov et al. | |
| 2017/0060546 A1 | 3/2017 | Prasad et al. | |
| 2017/0147338 A1 | 5/2017 | Jackson et al. | |
| 2017/0264588 A1 | 9/2017 | Hunt et al. | |
| 2017/0300309 A1 | 10/2017 | Berger et al. | |
| 2017/0371499 A1 | 12/2017 | Checkley et al. | |
| 2018/0095993 A1 | 4/2018 | Clark | |
| 2018/0189043 A1 | 7/2018 | Habayeb | |
| 2019/0050576 A1 | 2/2019 | Boulton | |
| 2019/0080080 A1 | 3/2019 | Ogura et al. | |
| 2019/0130114 A1 | 5/2019 | Smith et al. | |
| 2019/0205121 A1 | 7/2019 | Ericson | |
| 2019/0303623 A1 | 10/2019 | Reddy et al. | |
| 2019/0306173 A1* | 10/2019 | Reddy | H04L 9/321 |
| 2019/0379723 A1 | 12/2019 | Demasi et al. | |
| 2020/0012441 A1* | 1/2020 | Chheda | G06F 3/065 |
| 2020/0026857 A1 | 1/2020 | Muller et al. | |
| 2020/0076618 A1 | 3/2020 | Driever et al. | |
| 2020/0076807 A1 | 3/2020 | Driever et al. | |
| 2020/0351089 A1 | 11/2020 | Wentz | |
| 2020/0372183 A1 | 11/2020 | Rangaiah et al. | |
| 2021/0111875 A1 | 4/2021 | Le Saint | |
| 2021/0218800 A1 | 7/2021 | Landman | |

OTHER PUBLICATIONS

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.

Jana et al. "Management of Security and Privacy Issues of Application Development in Mobile Cloud Environment: A Survey," IEEE International Conference on Recent Advances and Innovations in Engineering, May 2014, 6 pages.

Yoshida et al. "Understanding the Origins of Weak Cryptographic Algorithms Used for Signing Android Apps," 2018 42$^{nd}$ IEEE International Conference on Computer Software and Applications; 6 pages.

Patent Cooperation Treaty, International Search Report and Written Opinion issued for PCT Application No. PCT/IB2021/050134, dated Mar. 4, 2021, 14 pages.

JFrog; "Access Tokens," https://www.jfrog.com/confluence/display/JCR6X/Access+Tokens, Jan. 29, 2020 (Year: 2020), 1 page.

Alibaba Cloud; "Alibaba Dragonfly DCOS Case Study: China Mobile (Zhejiang Branch)," https://alibaba-cloud.medium.com/alibaba-dragonfly-dcos-case-study-china-mobile-zhejiang-branch-a13dc751a2c, Jan. 14, 2019 (Year: 2019), 14 pages.

eduonix.com; "Alibaba's DragonFly—A New P2P File Distribution Framework," https://blog.eduonix.com/software-development/alibabas-dragonfly-p2p-distribution/, Jul. 4, 2018 (Year: 2018), 3 pages.

Alibaba Cloud; "Behind Alibaba's Double 11 Mysterious "Dragonfly" Technology® C PB-Grade Large-File Distribution System," https://www.alibabacloud.com/blog/behind-alibabas-double-11-mysterious-dragonfly-technology-®c-pb-grade-large-file-distribution-system_594074, Oct. 15, 2018 (Year: 2018), 14 pages.

Seneviratne, AIDK; "Enabling an Authentication Mechanism for Docker Remote API," Mar. 2017 (Year: 2017), 70 pages.

IEEE; "FID: A Faster Image Distribution System for Docker Platform," 2017 (Year: 2017), 8 pages.

DragonFly; "What Is DragonFly?" https://web.archive.org/web/20190501065255/https://d7y.io/enus/docs/overview/what_is_dragonfly.html, May 1, 2019 (Year: 2019), 3 pages.

Uber Engineering Blog; "Introducing Kraken, an Open Source Peer-to-Peer Docker Registry," https://eng.uber.com/introducing-kraken/, May 5, 2019 (Year: 2019), 3 pages.

JFrog; "Searching for Artifacts," https://www.jfrog.com/confluence/display/JCR6X/Searching+for+Artifacts, Jan. 29. 2020 (Year: 2020), 3 pages.

* cited by examiner

TRANSACTION LOG 400

| Software Release | Version | Bundle Info | Date/Time/Author | Target Nodes | Completed Nodes | Incomplete Nodes | License(s) | Public Key(s) |
|---|---|---|---|---|---|---|---|---|
| SR_01 | 1.1 | Checksums_1 | 5/23/19 08:44:37 | 1-7 | 1, 2, 4-6 | 3, 7 | Lic_01 | Keys 1, 2, 4 |
| SR_01 | 1.2 | Checksums_2 | 5/23/19 14:26:51 | 1-7 | 1-4, 6 | 5, 7 | Lic_01 | Keys 3, 5, 6 |
| ... | ... | ... | ... | ... | ... | ... | ... | ... |
| SR_02 | 1.1 | Checksums_3 | 5/24/19 20:19:03 | 1-5 | 1-5 | | Lic_02 | Keys 7-9 |

TRANSACTION LOG 410

DEPLOYED SOFTWARE RELEASE LOG 412

| Software Release | Nodes |
|---|---|
| SR_01 ver 1.1 | 1-7 |
| SR_01 ver 1.2 | 1-5 |
| ... | ... |
| SR_02 ver 1.1 | 1, 3-5, 7 |

NODE LOG 414

| Node | Software Releases Received |
|---|---|
| 1 | SR_01 ver 1.1, SR_01 ver 1.2, SR_02 ver 1.1 |
| 2 | SR_01 ver 1.1, SR_01 ver 1.2 |
| ... | ... |
| 7 | SR_01 ver 1.1, SR_02 ver 1.1 |

ARTIFACT VERSION LOG 416

| Artifact | Nodes | Vulnerability |
|---|---|---|
| 1.1 | 1-7 | no |
| 1.2 | 1-5, 7 | yes |
| ... | ... | ... |
| 4.3 | 1, 2, 5-7 | no |

*FIG. 4B*

SOFTWARE RELEASE TRACKING AND LOGGING

CROSS-REFERENCE TO RELATED APPLICATIONS

The present application is a continuation of U.S. patent application Ser. No. 16/931,898 filed Jul. 17, 2020, and entitled "SOFTWARE RELEASE TRACKING AND LOGGING"; claims the benefit of U.S. Provisional Application No. 62/876,562 filed Jul. 19, 2019, and entitled "SOFTWARE RELEASE TRACKING AND LOGGING"; and is related to U.S. patent application Ser. No. 16/399,905 entitled "DATA BUNDLE GENERATION AND DEPLOYMENT," filed Apr. 30, 2019, to U.S. patent application Ser. No. 16/399,938 entitled "DATA FILE PARTITION AND REPLICATION," filed Apr. 30, 2019, and to U.S. patent application Ser. No. 16/399,953 entitled "DATA FILE PARTITION AND REPLICATION" filed Apr. 30, 2019, the contents of which are incorporated by reference herein in their entirety.

TECHNICAL FIELD

The present application is generally related to the technical field of software distribution, and more particularly, but not by way of limitation, to techniques for tracking software releases.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues.

After a software release is deployed and in use by one or more devices, an issue or problem may be identified. For example, an operating bug, a data breach issue, a safety issue, a worm, or other malware may be identified in existing software. However, identifying that a problem exists does not indicate the scope/extent of the problem or a resolution of the problem. In order to determine how the problem affects deployed software, a large amount of computational resources and personnel resources may be needed. For example, it may be difficult to determine which version of a software release is being executed at various devices, and which versions of software releases include the problem. In addition, how to respond to or compensate for the identified problem is not always readily apparent. Thus, dealing with an identified problem can be a time and resource-consuming process.

BRIEF SUMMARY

Embodiments of the present disclosure provide systems, methods, and computer-readable storage media that provide for tracking one or more software releases, such as one or more software releases deployed via a network. For example, when deploying a software release (e.g., transmitting a software release to one or more node devices via the network), a server may generate and/or maintain a transaction log that indicates that the software release was deployed to the one or more node devices. To illustrate, the transaction log may include information indicating target nodes of the software release, successfully completed nodes (e.g., nodes that successfully received the software release), incomplete nodes (e.g., nodes that failed to receive the software release), information indicating which version of a software release is being executed at node devices, other information, or a combination thereof. Thus, the transaction log may include information sufficient to enable determination of one or more node devices to which the software release has been deployed. In addition to tracking software releases, the server may analyze files for vulnerabilities. For example, the server may identify vulnerability information (e.g., receive and/or generate the vulnerability information) and analyze one or more files based on the vulnerability information to identify a particular file that poses a risk. For example, the server may access vulnerability information received from a data source or generated by an entity to identify a particular file that poses a risk (e.g., has a bug, includes malware, corresponds to an expired license, etc.). The analysis may occur after a software release that includes the particular file has been deployed, as vulnerability information is generated or received. After identifying the particular file, the server may identify a set of node devices at which the particular file is deployed. For example, the server may access the transaction log to determine which node devices are currently executing a software release that includes the particular file (and thus are vulnerable).

The server may perform (e.g., initiate transmission of) one or more corrective actions to account for the risk posed by the particular file. For example, the server may send a notification to an entity device with one or more options for corrective actions, and a user may select a particular corrective action to be implemented. Alternatively, the server may automatically initiate a corrective action, such as deploying a new software release that does not include the at least one file (or that includes previous versions of the at least one file that do not have the vulnerability) or issuing instructions to node devices to perform a "roll-back" to a previous version of the software release that does not include the at least one file. As another example, the server may send a message to a user indicating that a license is expired and requires renewal, and/or the server may instruct node devices to prohibit functionality corresponding to the license. Thus, the systems, methods, and computer-readable storage media described herein enable determination of the scope of a vulnerability and the initiation of corrective actions quickly and with little to no use of personnel resources.

According to one embodiment, a method for securely updating a software release across a network is described. The method includes compiling a transaction log including information sufficient to identify one or more nodes in a network to which a software release has been transmitted. The method includes identifying vulnerability information associated with one or more files included in the software release. The method includes analyzing the one or more files based on the vulnerability information to identify at least one file of the one or more files that poses a risk. The method includes identifying, based on the transaction log, one or more nodes at which the at least one file is deployed. The method further includes initiating, based on identifying the one or more nodes, transmission of a corrective action to the one or more nodes. The corrective action is responsive to the posed risk.

According to yet another embodiment, a system for securely updating a software release across a network is described. The system includes at least one memory storing instructions and one or more processors coupled to the at least one memory. The one or more processors are configured to execute the instructions to cause the one or more processors to compile a transaction log including information sufficient to identify one or more nodes in a network to which a software release has been transmitted. The one or more processors can further be configured to execute the instructions to cause the one or more processors to identify vulnerability information associated with one or more files included in the software release. The one or more processors are further configured to execute the instructions to cause the one or more processors to analyze the one or more files based on the vulnerability information to identify at least one file of the one or more files that poses a risk. The one or more processors are further configured to execute the instructions to cause the one or more processors to identify one or more nodes at which the at least one file is deployed. The one or more processors can be further configured to execute the instructions to cause the one or more processors to initiate, based on identifying the one or more nodes, transmission of a corrective action to the one or more nodes. The corrective action is responsive to the posed risk.

According to another embodiment, a computer program product is described that includes a computer-readable storage device, such as a non-transitory computer-readable storage medium, that includes instructions that, when executed by one or more processors, cause the one or more processors to perform operations for securely updating a software release across a network. The operations include executing a first routine to compile a transaction log including information sufficient to identify one or more nodes in a network to which a software release has been transmitted. The operations further include executing a second routine to identify vulnerability information associated with one or more files included in the software release. The operations also include executing a third routine to analyze the one or more files based on the vulnerability information to identify at least one file of the one or more files that poses a risk, executing a fourth routine to identify, based on the transaction log, one or more nodes at which the at least one file is deployed, and executing a fifth routine to initiate, based on identifying the one or more nodes, transmission of a corrective action to the one or more nodes. The corrective action is responsive to the posed risk.

According to another embodiment, a method for tracking software releases is described. The method includes initiating transmission of a software release to a node device. The software release includes one or more files selected by an entity device. The method includes maintaining a transaction log based on transmitting the software release. The transaction log indicates software releases deployed to one or more node devices. The method includes identifying vulnerability information. The method includes analyzing the one or more files based on the vulnerability information to identify a particular file of the one or more files that poses a risk. The method includes identifying, based on the transaction log, a set of node devices at which the particular file is deployed. The method further includes initiating, based on identifying the set of node devices, transmission of a corrective action to the set of node devices. The corrective action is responsive to the particular file failing the analysis.

According to yet another embodiment, a system for tracking software releases is described. The system includes at least one memory storing instructions and one or more processors coupled to the at least one memory. The one or more processors are configured to execute the instructions to cause the one or more processors to initiate transmission of a software release to a node device. The software release includes one or more files selected by the entity device. The one or more processors are further configured to execute the instructions to cause the one or more processors to maintain a transaction log based on transmitting the software release. The transaction log indicates software releases deployed to one or more node devices. The one or more processors can further be configured to execute the instructions to cause the one or more processors to identify vulnerability information. The one or more processors are further configured to execute the instructions to cause the one or more processors to analyze the one or more files based on the vulnerability information to identify a particular file of the one or more files that poses a risk. The one or more processors are further configured to execute the instructions to cause the one or more processors to identify a set of node devices at which the particular file is deployed. The one or more processors can be further configured to execute the instructions to cause the one or more processors to initiate transmission of a corrective action to the set of node devices. The corrective action is responsive to the particular file failing the analysis.

According to another embodiment, a computer program product is described that includes a computer-readable storage device, such as a non-transitory computer-readable storage medium, that includes instructions that, when executed by one or more processors, cause the one or more processors to perform operations for tracking software releases. The operations include executing a first routine to initiate transmission of a software release to a node device. The software release includes one or more files selected by an entity device. The operations further include executing a second routine to maintain a transaction log based on transmitting the software release. The transaction log indicates software releases deployed to one or more node devices. The operations further include executing a third routine to identify vulnerability information. The operations also include executing a fourth routine to analyze the one or more files based on the vulnerability information to identify a particular file of the one or more files that poses a risk, executing a fifth routine to identify, based on the transaction log, a set of node devices at which the particular files is deployed, and executing a sixth routine to initiate, based on identifying the set of node devices, transmission of a corrective action to the set of node devices. The corrective action is responsive to the particular file failing the analysis.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which:

FIGS. 4A-4B illustrate examples of transaction logs;

DETAILED DESCRIPTION OF THE INVENTION

Figure 1:
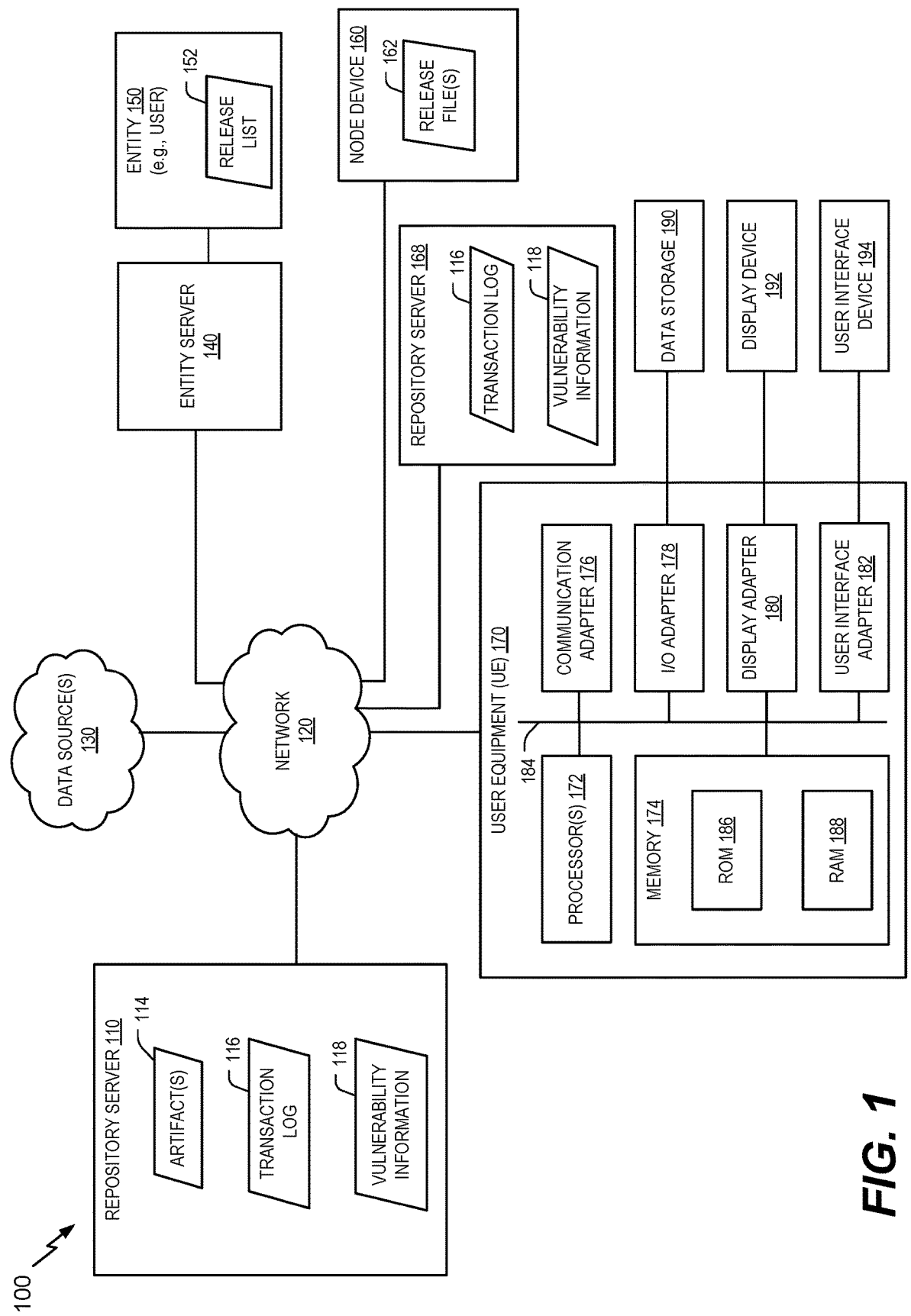
FIG. 1 is a block diagram of an example of a system that includes a server for tracking a software release.

Inventive concepts utilize a system to track a software release. To illustrate, a server may deploy a software release to a group of node devices. In addition, the server may compile (e.g., generate, maintain, and/or update) a transaction log including information indicating deployment of software releases to node devices. For example, the transaction log may include a set of target node devices corresponding to the software release, a set of completed node devices (e.g., node devices that have successfully received the software release), a set of incomplete node devices (e.g., node devices that have not received the software release), information indicating which software release is being executed at each node device, other information, or a combination thereof. To further illustrate, the transaction log may include internet protocol (IP) addresses of the node devices, path addresses of the node devices, uniform resource locators (URLs) corresponding to the node devices, device identifiers (e.g., media access control (MAC) addresses, etc.) of the node devices, or a combination thereof. Thus, the transaction log may include information sufficient to (e.g., configured to) enable determination of one or more node devices to which a software release has been deployed (e.g., transmitted to and either accepted, rejected, or not received). By using this information, the server can quickly and easily identify one or more nodes executing a particular software release when an issue with the particular software release is identified.

Issues may be detected as the server analyzes files. To illustrate, the server may analyze files based on vulnerability information. The vulnerability information may be generated by an entity that uses the server and may indicate files with bugs or security issues, and/or the vulnerability information may be received from external data sources that provide information indicating malicious files. Because the vulnerability information may be updated over time, a file that previously passed analysis may be identified as having a vulnerability at a later time. Thus, even though files are analyzed before being deployed and/or as part of a deployment operation of a software release, at least one file may later be identified as posing a risk. For example, the at least one file may include a bug, a malicious file (e.g., a worm or other malware), or a license corresponding to the at least one file may have expired, as non-limiting examples.

In order to account for the risk, the server identifies one or more node devices that are affected by the risk. For example, the server accesses the transaction log to determine one or more node devices that are executing software releases that include that at least one file. After identifying the one or more node devices, the server initiates a corrective action. The correction action may include sending a notification to a user of an entity device to request selection of one or more options, or the corrective action may be an automatic action initiated by the server. For example, the server may generate and deploy a new software release that does not include the at least one file (or that includes previous versions of the at least one file that do not include the vulnerability) or the server may instruct the one or more node devices to roll-back to a previous version of the software release that does not include the at least one file. As another example, the server may send a message to a user corresponding to the entity that a license is expired and requires renewal, and/or the server may instruct node devices to disable functionality that corresponds to the expired license. Thus, the system described herein can quickly and easily identify a scope of the effect of an identified problem, such as which node devices are effected, through use of the transaction log. Additionally, the system may perform a corrective action to account for the risk posed by the vulnerability, with or without user input, which reduces the personnel needed to perform risk analysis and determine what actions to take in response to detection of a vulnerability.

In some implementations, the transaction log is searchable by the entity. For example, the transaction log may be searchable to enable an entity to search for which software releases contain a particular file, and which node devices are executing the software releases. To further illustrate, an entity may identify a file that was worked on an employee who left the company under strained circumstances, and by searching the transaction log, the entity may identify each node device that is executing a software release that includes the file. Using this information, the entity may initiate a corrective action that includes deploying a new software release or initiating a roll-back to cause these node devices to execute software releases that do not include the file. Thus, by using this information, an entity can quickly and easily identify one or more node devices based on search parameters for which a corrective action may be performed.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may include a machine- or machines-executable instructions. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, include one or more physical or logical blocks of computer instructions that may be organized as an object, procedure, or function. Nevertheless, the executables of an identified module need not be physically located together, but may include disparate instructions stored in different locations that, when joined logically together, include the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for tracking software release is shown and designated 100. For example, the server may track and securely update the software release across a network. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to one implementation, are configured to perform several of the functions and/or operations described herein. One or more of the servers including server 110 may include memory, storage hardware, software residing thereon, and one or more processors configured to perform functions associated with system 100, as described further herein at least with reference to FIGS. 2 and 3. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of repository server 110 to access and modify aspects (e.g., instructions, applications, data) of repository server 110. For example, components including user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity server 140, entity 150, node device 160, and/or server 168.

As shown, server 110 includes one or more artifacts 114, a transaction log 116, and vulnerability information 118. Artifacts 114 may include one or more binaries (e.g., a computer file that is not a text file). Artifacts 114 may correspond to one or more package types. For example, a first artifact may correspond to a first package type, such as Maven, and a second artifact may correspond to a second package type, such as Bower. Transaction log 116 may indicate which devices one or more software releases (e.g., one or more artifacts 114) have been deployed to. For example, transaction log 116 may include interne protocol (IP) addresses of the node devices, path addresses of the node devices, uniform resource locators (URLs) corresponding to the node devices, device identifiers (e.g., media access control (MAC) addresses, etc.) of the node devices, or a combination thereof. Server 110 may be configured to update transaction log 116 each time a software release is deployed. Vulnerability information 118 may indicate vulnerabilities with one or more of artifacts 114. For example, vulnerability information 118 may include one or more checksums (indicating artifacts for which a risk is detected), license information associated with one or more artifacts, public keys that correspond to private keys used to affirm that a software release has successfully completed one or more stages of a development process, or a combination thereof.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. In some implementations, entity 150 includes or is configured to generate (or initiate generation of) a release list 152. Release list 152 corresponds to one or more files (e.g., artifacts) to be included in a software release. For example, release list 152 may correspond to a build job. In some implementations, entity 150 provides release list 152 to server 110 to cause server 110 to generate release information (e.g., release bundle information). In other implementations, entity 150 provides a query and/or one or more parameters for a query which is performed by server 110 to generate release list 152 and/or release information at server 110. To illustrate, entity 150 initiates a query by server 110 to identify one or more files corresponding to a particular build job identifier and to generate corresponding release information.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 includes one or more release files 162. To illustrate, software (e.g., packages), such as the one or more release files 162, hosted at node device 160 may be part of a software release which is a secure and immutable collection of one or more artifacts that make up a software release. In some implementations, the release files 162 include or correspond to release list 152. The release files 162 stored at and/or executed by node device 160 may be tracked by repository server 110 using transaction log 116.

In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing artifacts 114. In some implementations, server 168 maintains transaction log 116 and vulnerability information 118.

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can include a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 (and/or server 168) using a device via one or more networks, such as network 120, which itself can include one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
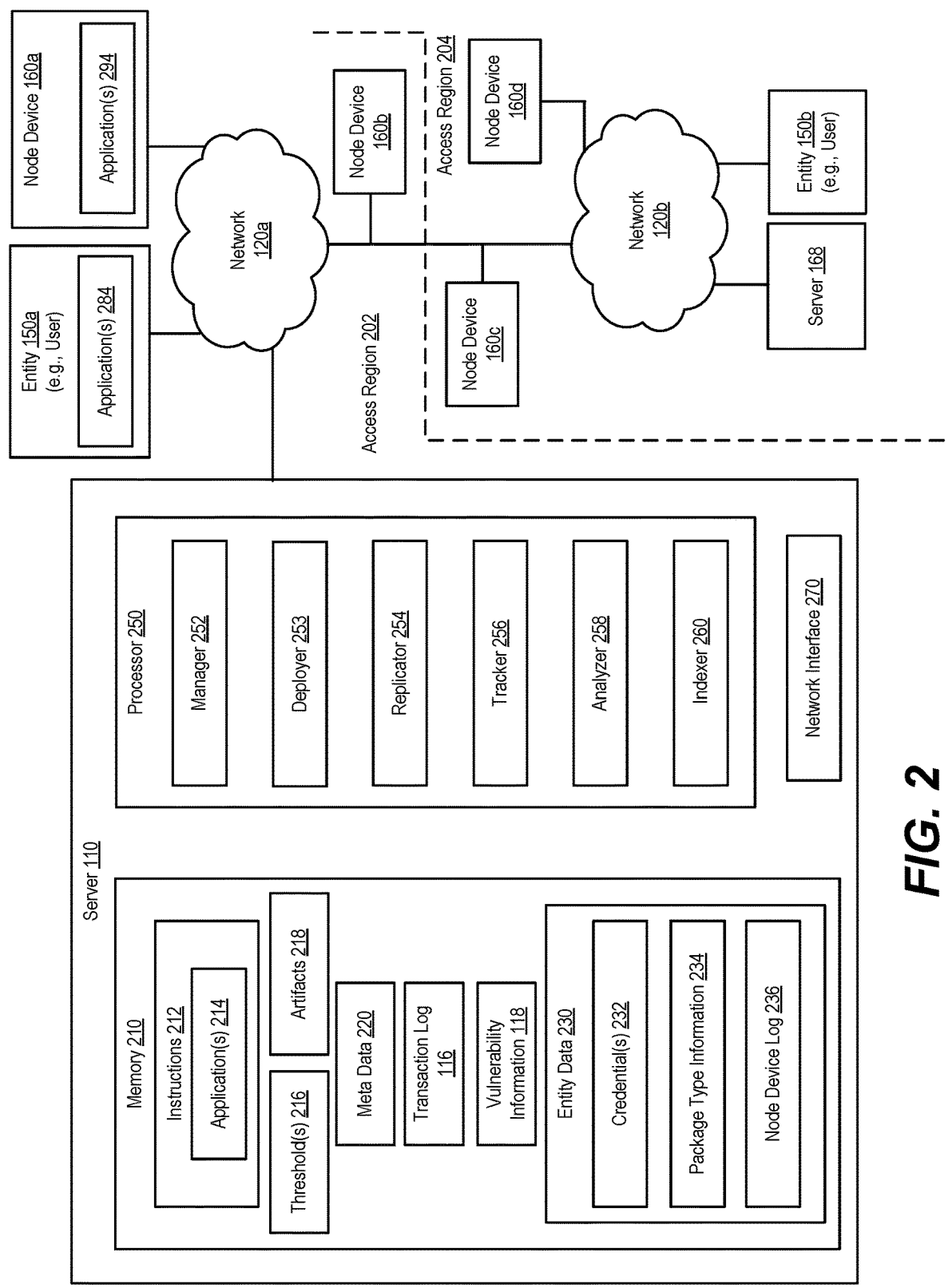
FIG. 2 is a block diagram of another example of a system for tracking software.

Referring to FIG. 2, a block diagram of a system for monitoring one or more software releases according to an embodiment is shown as a system 200. For example, system 200 may track and secure update a software release across a network. System 200 may include or correspond to at least a portion of system 100. System 200 includes server 110, networks 120a, 120b, entities 150a, 150b, node devices 160a, 160b, 160c, 160d, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 168 is included in second region 204. Server 168 may be a repository server and may include or correspond to server 110. In some implementations, server 110 and server 168 may be included in a universal artifact management system. Networks 120a, 120b may include or correspond to network 120. Each of the entities 150a, 150b may include or correspond to entity 150. In some implementations, a first entity 150a and a second entity 150b may be part of the same group, company, etc., or may be part of different groups, companies, etc. Each of node devices 160a, 160b, 160c, 160d may include or correspond to node device 160. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more of entities (e.g., 150a, 150b), one or more node devices (e.g., 160a, 160b, 160c, 160d), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or nonpersistent state, or a combination of different memory devices. Memory 210 includes (e.g., is configured to store) instructions 212, thresholds 216, artifacts 218 (e.g., binaries), meta data 220, a transaction log 116, vulnerability data 118, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to replicator 254.

In some implementations, memory 210 includes multiple memories accessible by processor 250. In some such implementations, one or more of the memories may be external to server 110. To illustrate, at least one memory may include or correspond to a database accessible to server 110, such as a database that stores one or more thresholds 216, artifacts 218, meta data 220, transaction log 116, vulnerability information 118, entity data 230, or any combination thereof. In some implementations, memory 210 may include or be coupled to cloud storage such that one or more thresholds 216, one or more of artifacts 218, meta data 220, transaction log 116, vulnerability information 118, and/or entity data 230 is stored at a cloud storage location and accessible by server 110.

Threshold(s) 216 may include or correspond to one or more thresholds, such as a time period threshold, a size threshold, a vulnerability threshold, etc. Artifacts 218 may include or correspond to artifacts 114. Meta data 220 may include meta data for artifacts 114, meta data for application 214, meta data for one or more files (e.g., 116), or any combination thereof. Meta data for an artifact (e.g., 114) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples. Memory 210 may also include software release information, which may include one or more checksums and metadata, such as meta data 220. The software release information (e.g., release bundle information) may correspond to and be transmitted with a software release, as further described in U.S. patent application Ser. No. 16/399,905.

Transaction log 116 includes an indication, such as a log, of one or more software releases and indications of which node devices the one or more software releases have been deployed to. Examples of transaction logs are further described with reference to FIGS. 4A and 4B. Vulnerability information 118 may indicate vulnerabilities with one or more of artifacts 114. For example, vulnerability information 118 may include one or more checksums (indicating artifacts for which a risk is detected), license information associated with one or more artifacts, public keys that correspond to private keys used to affirm that a software release has successfully completed one or more stages of a development process, or a combination thereof.

Entity data 230 may include data associated with one or more entities. For example, entity data 230 may include or correspond to one or more of entity 150a, 150b. Entity data 230 may include one or more credentials 232, package type information 234, and a node device log 236. Credential 232 include login information to enable one or more users and/or one or more entities to access server 110. Additionally, or alternatively, credential 232 may include security or authentication information, such as a private key, a public key, and/or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a set of target nodes at which one or more security objects are to be synchronized.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described furtherherein. A module is "[a] self-contained hardware or software component that interacts with a larger system." Alan Freedman, "The Computer Glossary" 268 (8th ed. 1998). A module may include a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150*a*) to manage one or more other components/modules (e.g., 253, 254, 256, 258, 260) of processor 250. Additionally, or alternatively, manager 252 may enable storage of and/or access to one or artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150*a*) to monitor and control a first instance of a user account (corresponding to first region 202) and a second instance of the user account (corresponding to second region 204). For example, the entity (e.g., 150*a*) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., the processor 172 of FIG. 1) or processor 250 to enable a user (e.g., 150*a*) to manage one or more other components/modules (e.g., 253, 254, 256, 258, 260) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. For example, a release bundle may be generated and transmitted, as further described in U.S. patent application Ser. No. 16/399,905. A release bundle may include one or more files and/or release information which includes or indicates a list of the one or more files (e.g., artifacts) to be included in the release bundle and meta data (e.g., properties) associated with the release bundle. The release information may include, for each file of the bundle release, a checksum (of the file), meta data (corresponding to the file), or both. In some implementations, the release bundle also includes additional meta data (e.g., file name, file size, path to the file, etc.) corresponding to the release bundle, such as a release bundle name, a version number, a source identifier, description information, release data, and/or a size. Additionally, or alternatively, the release information may include a signature (or other cryptography technique) to render the release information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Compiling and maintaining the information by deployer 253 enables tracker 256 to perform tracking of software releases to various node devices. Additionally, or alternatively, a software release may be provisioned amongst one or more nodes devices (e.g., 160*a*, 160*b*, 160*c*, 160*d*). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 168, between server 110 and one or more of node devices 160*a*, 160*b*, 160*c*, 160*d*, or both. Replicator 245 may be configured to determine a difference between files in a software release and files stored at a node device and to replicate the files that are not stored at the node device, as further described with reference to U.S. patent application Ser. No. 16/399,938 and U.S. patent application Ser. No. 16/399,953. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160*a*, 160*b*, 160*c*, 160*d*). Additionally, or alternatively, replicator 254 may be configured to identify a difference between at least one file stored at a first device (e.g., sewer 110) and one or more files stored at a second device (e.g., sewer 168 or a node device), and initiate transfer of at least one or more portions of a file to the second device. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more artifacts, meta data, one or more release bundles, or any combination thereof deployed or attempted to be deployed to a node device, such as one or more of node devices 160*a*, 160*b*, 160*c*, 160*d*, a server (e.g., server 110, 168), or both. Tracker 256 may also maintain transaction log 116. Tracker 256 may be configured to be used in conjunction with deployer 253, replicator 254, and or analyzer 258 to track one or more artifacts, meta data, one or more release bundles, or any combination thereof. In some implementations, tracker 256 includes a tracker module that includes one or more routines, executable by one or more processors (e.g., the processor 172 of FIG. 1) or processor 250 to track one or more artifacts, meta data, one or more release bundles, or any combination thereof deployed or attempted to be deployed to a node device, such as one or more of node devices 160*a*, 160*b*, 160*c*, 160*d*, and/or one or more servers.

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). For example, analyzer 258 may be configured to analyze one or more files for vulnerabilities based on vulnerability information 118 (which indicates vulnerabilities with files). Analyzer 258 may be configured to analyze software prior to deployment in addition to analyzing software that has already been deployed (e.g., based on updated vulnerability information). Analyzer 258 may be configured to notify tacker 256 when a vulnerability is identified. In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Figure 3:
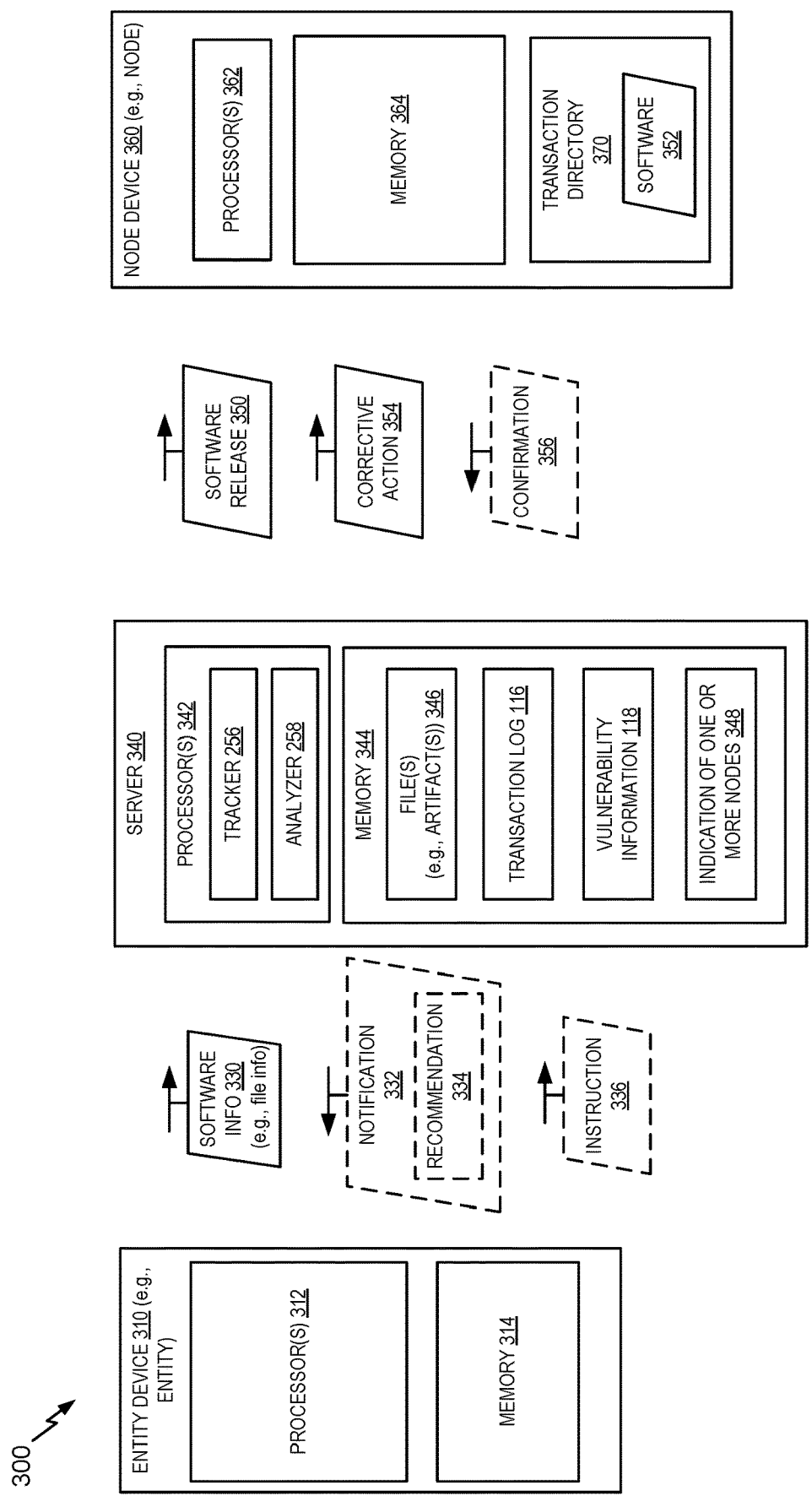
FIG. 3 is a block diagram of another example of a system for tracking a software.
Figure 5:
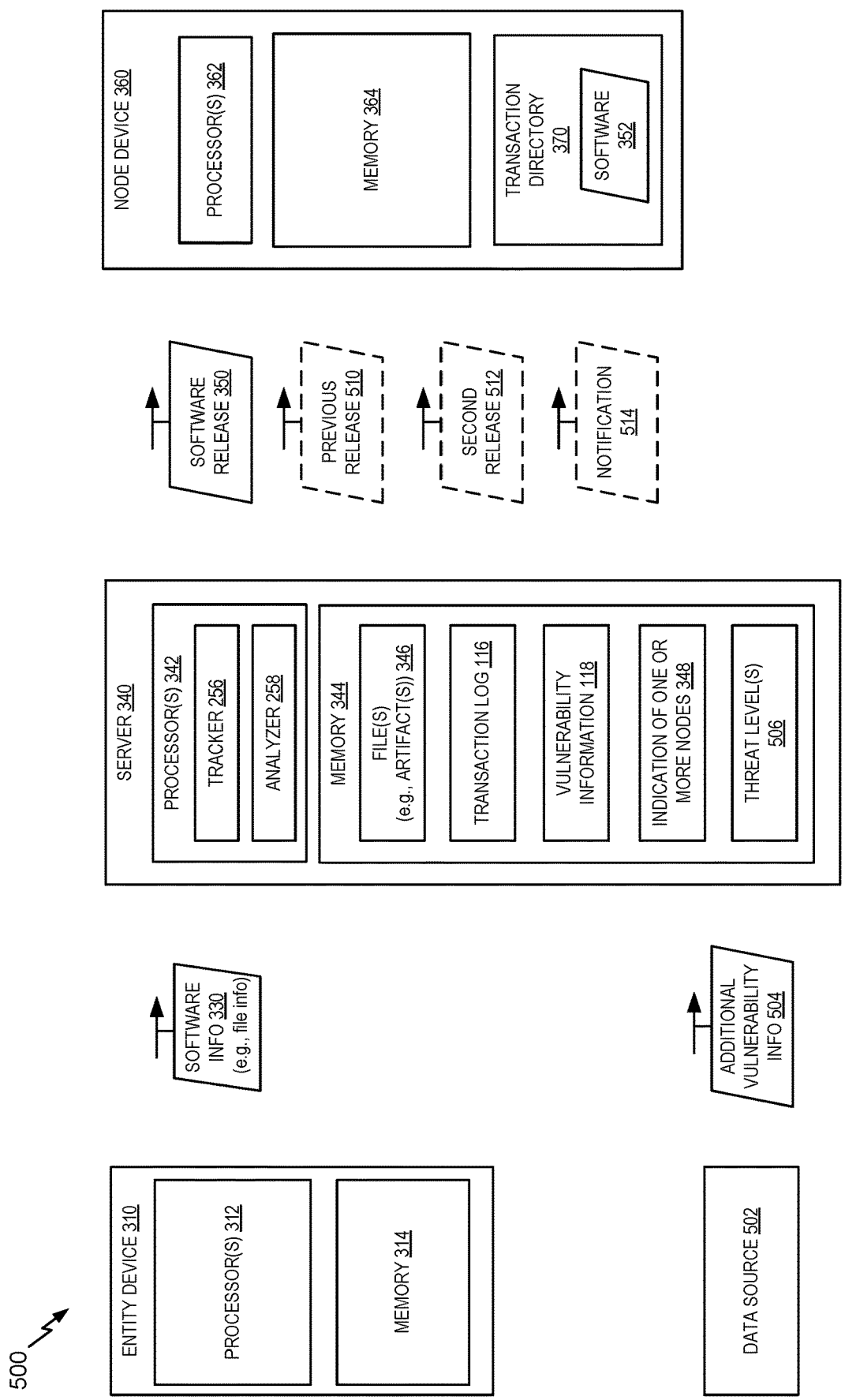
FIG. 5 is a block diagram of another example of a system for tracking a software release.

FIGS. 3 and 5 are block diagrams of systems for tracking and/or securely updating a software release across a network. For example, FIG. 3 shows a block diagram of a system 300 for tracking software releases, and FIG. 5 shows a block diagram of a system 500 for tracking software releases. Each of system 300 and system 500 may include or correspond to at least a portion of system 100 and/or system 200. Although described separately, the system 300 and the system 500 may be the same system. Accordingly, operations described with reference to system 300 may be performed by system 500, and vice versa.

Referring to FIG. 3, a block diagram of a system for tracking and/or securely updating a software release across a network is shown and designated 300. System 300 includes an entity device 310 (also referred to herein as an entity), a server 340, and a node device 360 (also referred to herein as a node). Entity device 310, server 340, and node device 360 may be coupled via one or more networks, such as network 120. Entity device 310 may include or correspond to entity server 140, entity 150, 150a, 150b, or any combination thereof. Server 340 may include or correspond to server 110, server 168, or a combination thereof. Node device 360 may include or correspond to node device 160, 160a, 160b, 160c, 160d.

Entity device 310 includes one or more processors 312 and a memory 314. Memory 314 may include instructions (not shown) that are executable by processor 312 to cause processor 312 to perform one or more operations. In some implementations, the instructions may include or be arranged as an application, such as application 284 (e.g., a software program), associated with server 340. The operations may include sending software information, receiving notifications, and/or sending instructions, as further described herein.

Server 340 includes one or more processors 342 and a memory 344. Processor 342 may include or correspond to processor 250. In a particular implementation, processor 342 includes tracker 256 and analyzer 258. Memory 344 may include or correspond to memory 210. Memory 344 includes a one or more files 346 (e.g., artifacts), transaction log 116, vulnerability information 118, and an indication of one or more nodes 348, as further described herein. The one more files 346 may include or correspond to artifacts 114 and/or artifacts 218. In some implementations, files 346 may include or be a part of one or more software releases. Additionally, memory 344 may include instructions (not shown) that are executable by processor 342 to cause processor 342 to perform one or more operations. In some implementations, the instructions may include or be arranged as an application, such as application 214 (e.g., a software program).

Although system 300 is described as including one server 340, in other implementations, system 300 may include multiple servers (e.g., 340) coupled to entity device 310 and/or node device 360. Additionally, or alternatively, it is noted that server 340 (e.g., processor 342) may include one or more additional components or modules, such as manager 252, deployer 253, replicator 254, and/or indexer 260, as illustrative, non-limiting examples.

Node device 360 includes one or more processors 362, a memory 364 (e.g., one or more memories), and a transaction directory 370. Transaction directory 370 may include or correspond to a storage device configured to receive and store one or more files. In some implementations, transaction directory 370 is distinct from memory 364. In other implementations, transaction directory 370 includes a logical or virtual portion of memory 364.

Memory 364 may include instructions (not shown) that are executable by processor 362 to cause processor 362 to perform one or more operations. In some implementations, the instructions may include or be arranged as an application, such as application 294 (e.g., a software program). Additionally, or alternatively, memory 364 may include one or more files (e.g., software), such as software corresponding to a release bundle.

Although system 300 is described as including one node device 360, in other implementations, system 300 may include multiple node devices (e.g., 360) coupled to server 340. Additionally, or alternatively, it is noted that node device 360 (e.g., processor 362) may include one or more additional components or modules, such as manager 252 and/or replicator 254, as illustrative, non-limiting examples.

During operation of system 300, entity device 310 transmits software information 330 to server 340. Software information 330 includes file information, such as an indication of files to be included in a software release. For example, software information 330 may include a list of the files to be included in a software release, a query that corresponds to the files to be included in a software release, etc. In some implementations, software information 330 includes the files, or the files are transmitted along with software information 330. In other implementations, the files are already stored at server 340, and only an indication of which files are to be included in the software release is transmitted.

Server 340 receives software information 330 and generates software release 350. Software release 350 includes one or more files selected by entity device 310. For example, software release 350 includes files indicated by software information 330. Software release 350 may include the one or more files (e.g., one or more of files 346) and release information, such as one or more checksums, metadata, or a combination thereof, as further described in U.S. patent application Ser. No. 16/399,905. After generating software release 350, server 340 initiates transmission of software release 350 to node device 360. Initiating transmission may include deploying software release 350, which may include replicating some of one or more files 346, as further described in U.S. patent application Ser. No. 16/399,938 and U.S. patent application Ser. No. 16/399,953.

Node device 360 may receive software release 350 and store the one or more files as software 352 in transaction directory 370. Node device 360 may perform one or more verification operations on software 352 before transferring software 352 to memory 364 for execution. In some implementations, upon receipt (or verification) of software 352, node device 360 transmits a confirmation 356 to server 340. Confirmation 356 indicates acceptance of software release 350 at node device 360. If verification fails, node device 360 may transmit a notification to server 340. The notification may indicate which file(s) failed verification, may indicated which version of the software release is currently being executed at node device 360, or both.

Server 340 (e.g., tracker 256) compiles and maintains transaction log 116 based on transmitting software release 350. Transaction log 116 may include information identifying one or more nodes to which software release 350 has been transmitted. As an example of compiling (or maintaining) transaction log 116, server 340 may generate a new entry in transaction log 116 corresponding to software release 350. The new entry may include information corresponding to software release 350, such as a name, a version number, etc. The new entry may also include release information associated with software release 350. For example, the release information may include, for each of the one or more files, a corresponding checksum, a bundle checksum for an entirety of the one or more files, and/or metadata associated with software release 350. The metadata may include an indication of target nodes for software release 350, an indication of target nodes that have received software release 350, an indication of target nodes that have not received software release 350, an indication of nodes that are executing software release 350, additional information, or any combination thereof. Tracker 256 may update the new entry to indicate that software release 350 has been received at node device 360 based on receipt of confirmation 356. Additionally, tracker 256 may update one or more other entries to indicate that versions corresponding to the one or more other entries are no longer the most recently released version. If confirmation 356 is not received, tracker 256 may update the entry to indicate that node device 360 has not received software release 350. Examples of transaction logs are further described with reference to FIGS. 4A and 4B.

In addition to maintaining transaction log 116, server 340 identifies vulnerability information 118. Vulnerability information 118 may be stored at memory 344 and may include information received from one or more data sources, information received from entity device 310, information determined by server 340, or any combination thereof. Vulnerability information 118 may indicate one or more files that pose risks. Risks may be posed by files that, during execution, expose a device to a vulnerability (e.g., a virus, a weakness, etc.). Additionally, or alternatively, risks may be posed by outdated licenses. Thus, vulnerability information may include identifiers (e.g., checksums) of files that pose risks, license information (e.g., information indicating when licenses associated with one or more files expire), or a combination thereof.

After identifying vulnerability information 118, server 340 (e.g., analyzer 258) analyzes the one or more files (e.g., of files 346 that are included in software release 350), or stored release information corresponding to files 346, based on vulnerability information 118 to identify a particular files of the one or more files that poses a risk. For example, analyzer 258 may identify a file having a checksum that matches a checksum in vulnerability information 118, and thus poses a risk. Additionally, or alternatively, analyzer 258 may identify a file corresponding to a license that has expired. Additionally, or alternatively, analyzer 258 may identify a file that fails verification for completing one or more development stages of a development process of software release 350.

In a particular implementation, analyzer 258 analyzes the one or more files based on detection of a vulnerability-related event. The vulnerability-related event may include receipt of additional vulnerability information, such as from a data source (e.g., data source 130), detection of a change (e.g., an expiration) in a license, or a combination thereof. Thus, analyzer 258 may analyze the files of software releases at times when vulnerability information 118 is subject to change. Additionally, or alternatively, analyzer 258 may analyze the one or more files periodically or upon receipt of a request from entity device 310.

In some implementations, analyzer 258 identifies a vulnerability and determines a vulnerability rating or range to which the vulnerability corresponds. For example, analyzer 258 may compare the vulnerability to one or more thresholds to determine if a rating is low, medium, or high. Alternatively, analyzer 258 may determine a numerical value from within a numerical range, such as 1-10, as a non-limiting example, that indicates the rating of the vulnerability. Different ratings of vulnerabilities may correspond to different corrective actions, as further described herein.

Server 340 (e.g., tracker 256) may identify, based on transaction log 116, an indication of one or more nodes 348 at which the particular file is deployed. For example, server 340 may access transaction log 116 to identify software release(s) that include the particular file and to identify one or more nodes that have received and/or are executing the identified software releases.

Server 340 may also transmit, based on identifying one or more nodes 348, a corrective action 354 to one or more nodes 348 (including node device 360 in the example of FIG. 3). Corrective action 354 is responsive to the posed risk. To illustrate, corrective action 354 may include sending a notification to entity device 310, generating a new software release and transmitting the new software release to node device 360, causing node device 360 to roll back to a previous version of software release 350, or sending a notification to node device 360 (and/or a user thereof), as non-limiting examples. In a particular implementation, corrective action 354 may include multiple actions, such as transmitting a notification to entity device 310 and instructing node device 360 to roll back to a previous version of software release 350 (after verifying that the previous version does not have the vulnerability). Corrective action 354 may thus account for the risk posed by the particular file by preventing execution of the particular file or by alerting a user to take action. Examples of corrective action 354 are further described with reference to FIG. 5.

In some implementations, prior to transmitting corrective action 354 (e.g., initiating corrective action 354 at node device 360), server 340 transmits a notification 332 to entity device 310. Notification 332 may include a recommendation 334. Recommendation 334 may include one or more options for the corrective action. For example, in response to identifying a vulnerability in a particular file in software release 350, recommendation 334 may include options of generating a new software release that includes a previous version of the particular file (e.g., one without the vulnerability), rolling back software release 350 to a previous version, or another recommendation, as non-limiting examples. In some implementations, each of the options may have already passed verification by analyzer 258. A user of entity device 310 may select one of the options of recommendation 334, and entity device 310 may transmit instruction 336 to server 340. Instruction 336 may indicate the selected corrective action. Based on receipt of instruction 336, server 340 may perform the specified corrective action as corrective action 354.

In some implementations, server 340 may receive second software information from entity device 310. The second software information indicates one or more files for inclusion in a second software release. Based on receipt of the second software information, server 340 transmits a second software release to node device 360 (and/or to other node devices). Based on transmitting the second software release, server 340 (e.g., tracker 256) maintains (e.g., updates) transaction log 116. For example, tracker 256 may add a second entry to transaction log 116, the second entry corresponding to the second software release. The second entry may include information corresponding to the second software release, release information corresponding to the second software release, metadata corresponding to the second software release, or a combination thereof. Maintaining (e.g., updating) transaction log 116 may also include modifying metadata corresponding to a different entry. For example, if the second software release is a newer version of software release 350, tracker 256 may modify metadata associated with the first entry (which indicated that software release 350 was the released (e.g., newest version) to indicate that software release 350 is no longer the released version. Additionally, metadata associated with the second entry may be generated to indicate that the second software release is the most currently released version. Thus, when a new version of a software release is deployed, metadata corresponding to the new entry and to other entries may be updated in transaction log 116. In this manner, different versions of the software release can be executing at different node devices, and transaction log 116 indicates which version is executed at which node device. Analyzer 258 can analyze files in any version of the software releases to determine if a vulnerability exists in one or more of the files.

In some implementations, server 340 (e.g., tracker 256) can leverage other information to enable entity device 310 to perform searches. For example, as part of software release deployment, as further described in U.S. patent application Ser. No. 16/399,905, server 340 may store metadata associated with the software releases, including information indicating authors of the files included in the software release. Although referred to as author, in some implementations, the metadata may include an indicator of each person who modified the files. This information may be searchable by entity device 310 and then leveraged by tracker 256 to search transaction log 116. For example, entity device 310 may initiate a search for all files that were modified by a particular author. Server 340 may search stored metadata to identify a set of files (e.g., one or more files) that were modified by the particular author. Tracker 256 may then access transaction log 116 to identify a set of node devices that are executing software releases that include the set of files. Thus, entity device 310 may be able to quickly and easily search for all node devices that are executing files modified by a particular author, in case a corrective action is needed (e.g., the particular author was known to include bugs in code, the particular author left the company under undesirable circumstances, etc.)

According to yet another embodiment, a system for securely updating a software release across a network is described. The system includes at least one memory (e.g., 344) storing instructions and one or more processors (e.g., 342) coupled to the at least one memory. The one or more processors are configured to execute the instructions to cause the one or more processors to compile a transaction log (e.g., 116) including information sufficient to identify one or more nodes in a network to which a software release (e.g., 350) has been transmitted. The one or more processors can further be configured to execute the instructions to cause the one or more processors to identify vulnerability information (e.g., 118) associated with one or more files (e.g., 346) included in the software release. The one or more processors are further configured to execute the instructions to cause the one or more processors to analyze the one or more files based on the vulnerability information to identify at least one file of the one or more files that poses a risk. The one or more processors are further configured to execute the instructions to cause the one or more processors to identify one or more nodes (e.g., 348) at which the at least one file is deployed. The one or more processors can be further configured to execute the instructions to cause the one or more processors to initiate transmission of a corrective action (e.g., 354) to the one or more nodes. The corrective action is responsive to the posed risk.

According to another embodiment, a computer program product is described that includes a computer-readable storage device, such as a non-transitory computer-readable storage medium, that includes instructions that, when executed by one or more processors, cause the one or more processors to perform operations for securely updating a software release across a network. The operations include executing a first routine to compile a transaction log (e.g., 116) including information sufficient to identify one or more nodes in a network to which a software release (e.g., 350) has been transmitted. The operations further include executing a second routine to identify vulnerability information (e.g., 118) associated with one or more files (e.g., 346) included in the software release. The operations also include executing a third routine to analyze the one or more files based on the vulnerability information to identify at least one file of the one or more files that poses a risk, executing a fourth routine to identify, based on the transaction log, one or more nodes (e.g., 348) at which the at least one file is deployed, and executing a fifth routine to initiate, based on identifying the one or more nodes, transmission of a corrective action (e.g., 354) to the one or more nodes. The corrective action is responsive to the posed risk.

According to yet another embodiment, a system for tracking software releases is described. The system includes at least one memory (e.g., 344) storing instructions and one or more processors (e.g., 342) coupled to the at least one memory. The one or more processors are configured to execute the instructions to cause the one or more processors to initiate transmission of a software release (e.g., 350) to a node device (e.g., 360). The software release includes one or more files selected by an entity device (e.g., 310). The one or more processors are further configured to execute the instructions to cause the one or more processors to maintain a transaction log (e.g., 116) based on transmitting the software release. The transaction log indicates software releases deployed to one or more node devices. The one or more processors can further be configured to execute the instructions to cause the one or more processors to identify vulnerability information (e.g., 118). The one or more processors are further configured to execute the instructions to cause the one or more processors to analyze the one or more files (e.g., 346) based on the vulnerability information to identify a particular file of the one or more files that poses a risk. The one or more processors are further configured to execute the instructions to cause the one or more processors to identify a set of node devices (e.g., 348) at which the particular file is deployed. The one or more processors can be further configured to execute the instructions to cause the one or more processors to initiate transmission of a corrective action (e.g., 354) to the set of node devices. The corrective action is responsive to the particular file failing the analysis.

Thus, FIG. 3 describes a system (e.g., 300) that compiles information used to track the deployment of software releases throughout a network. This information may be accessed in response to detection of a vulnerability in at least one file to quickly and easily assess the scope of the vulnerability and to perform a corrective action. Thus, the system described herein can quickly and easily identify a scope of an identified problem, such as which node devices are affected, through use of a transaction log (e.g., 116). Additionally, the system may perform a corrective action (e.g., 354) to account for the risk posed by the vulnerability, with or without user input, which reduces the personnel needed to perform risk analysis and determine what actions to take in response to detection of a vulnerability.

FIGS. 4A-4B illustrate examples of transaction logs. The transaction logs illustrated in FIGS. 4A-4B may include transaction log 116. One or both of the transaction logs illustrated in FIGS. 4A-4B may be compiled and maintained by a server, such as server 110, server 168, server 340, or any combination thereof.

Referring to FIG. 4A, an example of a transaction log 400 is shown. Transaction log includes information associated with one or more software releases, release information associated with one or more software releases, and metadata associated with one or more software releases. Although particular informational items are illustrated in FIG. 4A, in other implementations, transaction log 400 may include fewer information items or more information items than illustrated in FIG. 4A. The data structure illustrated in FIG. 4A is for illustration only, and in other implementations, transaction log 400 may include a different data structure.

In the example of FIG. 4A, transaction log 400 includes a first entry 402, a second entry 404, and a third entry 406. In other implementations, transaction log 400 may include fewer than three entries or more than three entries. Each of entries 402-406 correspond to a different software release, or a different version of a software release. For example, first entry 402 corresponds to version 1.1 of software release "SR_01", second entry 404 corresponds to version 1.2 of software release "SR_01", and third entry 406 corresponds to version 1.1 of software release "SR_02."

Maintaining transaction log 400 may include generating entries, such as entries 402-406, when versions of software releases are deployed. For example, first entry 402 may be generated when version 1.1 of software release "SR_01" is deployed. In a particular implementation, first entry 402 includes a software release identifier (e.g., "SR_01") corresponding to the software release, a version number (e.g., 1.1) corresponding to the software release, release information (e.g., "Checksums_1", which may be one or more checksums corresponding to the files in the software release and/or a bundle checksum corresponding to an entirety of the software release) corresponding to the software release, a time, date, and/or author corresponding to the software release (e.g., "5/23/19 08:44:37"), a set of target nodes (e.g., nodes 1-7) corresponding to the software release, a set of nodes that received the software release (e.g., nodes 1, 2, and 4-6), a set of nodes that failed to receive the software release (e.g., nodes 3 and 7), a set of nodes operating the software release, a license associated with the software release (e.g., "Lic_01"), and public keys associated with the software release (e.g., keys 1, 2, and 4, which may be used to verify that the software release completed development stages of a development process). Second entry 404 and third entry 406 may include similar information for the corresponding versions of the software releases.

Thus, transaction log 400 may store information regarding deployment of software releases that is searchable and enables a server to determine which node devices a particular software release has been deployed to. Such determination enables the server to identify node devices that are executing a particular file in case the particular file is determined to be a vulnerability and a corrective action is warranted.

Referring to FIG. 4B, an example of a transaction log 410 is shown. Transaction log 410 is another example of a transaction log. Transaction log 410 includes one or more data structures. For example, transaction log 410 may include a deployed software release log 412 (e.g., a first data structure), a node log 414 (e.g., a second data structure), and an artifact version log 416 (e.g., a third data structure). As shown, each of the data structures 412-416 include different information relating to deployed software releases and files (e.g., artifacts). In other implementations, the data structures 412-416 may include some of the same information. Although three entries are illustrated in each of data structures 412-416, in other implementations, fewer than three entries or more than three entries may be included.

To illustrate, deployed software release log 412 may indicate a software release identifier (e.g., a software release name and version number) and target nodes for the software release. For example, based on deployed software release log 412, software release "SR_01" version 1.1 was targeted for deployment to nodes 1-7, software release "SR_02" version 1.2 was targeted for deployment to nodes 1-5, and software release "SR_02" version 1.1 was targeted for deployment to nodes 1, 3-5, and 7. Node log 414 may indicate particular nodes in communication with the server and which software releases were received by the particular nodes. For example, based on node log 414, node 1 received software release "SR_01" version 1.1, software release "SR_01" version 1.2, and software release "SR_02" version 1.1, node 2 received software release "SR_01" version 1.1 and software release "SR_01" version 1.2, and node 7 received software release "SR_01" version 1.1 and software release "SR_02" version 1.1. Artifact version log 416 may indicate particular artifacts, which nodes the particular artifacts are located at, and whether or not the particular artifacts have a detected vulnerability. For example, based on artifact version log 416, artifact 1.1 is located at nodes 1-7 and does not have a detected vulnerability, artifact 1.2 is located at nodes 1-5 and 7 and has a detected vulnerability, and artifact 4.3 is located at nodes 1, 2, and 5-7 and does not have a detected vulnerability.

Similar to transaction log 400, the information of transaction log 410 may be searchable and enable a server to determine which node devices a particular software release (or artifact) has been deployed to. Such determination enables the server to identify node devices that are executing a particular file in case the particular file is determined to be a vulnerability and a corrective action is warranted.

Referring to FIG. 5, a block diagram of a system for tracking and/or securely updating a software release across a network is shown and designated 500. System 500 includes entity device 310, server 340, node device 360, and data source 502. Data source 502 may include or correspond to data source 130.

During operation of the system 500, server 340 receives software information 330 and transmits software release 350 to node device 360, as described with reference to FIG. 3. Additionally, server 340 receives additional vulnerability information 504 from data source 502. Data source 502 may include or correspond to a data source that is a repository for artifact vulnerabilities, a vulnerability provider service, etc. Server 340 receives additional vulnerability information 504 and combines additional vulnerability information 504 with vulnerability information 118 to maintain vulnerability information 118. Thus, vulnerability information 118 may be updated periodically or when new vulnerability information is released to keep vulnerability information 118 up-to-date.

After combining additional vulnerability information 504 with vulnerability information 118, server 340 (e.g., analyzer 258) may analyze files 346 based on vulnerability information 118 to identify at least one file that poses a risk, as described with reference to FIG. 3. In some implementations, server 340 (e.g., analyzer 258) may, responsive to determining that the at least file poses a risk, analyze one or more previous versions of the at least one file to determine whether the one or more previous versions of the at least one file pose the risk. After identifying the at least one file the poses the risk, analyzer 258 may interact with tracker 256 to identify software release(s) that include the at least one file for performance of a corrective action, such as a roll-back. For example, if one or more previous versions of the at least one file do not pose a risk, a possible corrective action may be to initiate a roll-back to a previous version of a software release, as further described herein.

After identifying the at least one file, and identifying one or more nodes 348 at which the at least one file is deployed, server 340 initiates corrective action 354 to account for the risk posed by the particular file. In a particular implementation, initiating corrective action 354 includes transmitting a previous version 510 of software release 350 to node device 360 (and other node devices of one or more nodes 348). For example, previous version 510 of the software release may be a version of the software release that lacked the at least one file and was not deployed to node device 360. Alternatively, previous version 510 of the software release may include a previous version of the at least one file that has been determined not to pose a risk. Thus, server 340 may initiate a roll-back to previous version 510 of the software release. In some implementations, previous version 510 of the software release may already be stored at node device 360, and server 340 simply transmits an instruction to node device 360 to deploy previous version 510 of the software release.

In another particular implementation, initiating corrective action 354 includes transmitting software release 350 to a node that is identified to be executing a previous version of the software release that includes the at least one file. For example, if the at least one file is identified in a previous version of software release 350, deploying software release 350 to the node device may eliminate the vulnerability caused by the at least one file. If software release 350 was already attempted to be deployed to node device 360, server 340 may retry deployment and/or send a notification to node device 360 (e.g., a notification to a user of node device 360). Additionally, or alternatively, server 340 may transmit a notification to entity device 310 so that a user of entity device 310 can contact a user of node device 360 to implement successful deployment of software release 350.

In another particular implementation, initiating corrective action 354 includes generating a second software release 512 that includes a new version of the at least one file that does not pose the risk (or that does not include the at least one file). For example, if the vulnerability is correctable, a new version of the at least one file may be generated (e.g., by entity device 310 or by server 340) and included in second software release 512. Alternatively, if the vulnerability is not correctable, the at least one file is not included in second software release 512. After generating second software release 512, server 340 transmits second software release 512 to node device 360 (and other node devices of one or more nodes 348).

In another particular implementation, initiating corrective action 354 includes transmitting a notification 514 to node device 360 (and other node devices of one or more nodes 348), or to a user of node device 360. Notification 514 may indicate one or more options to cure the risk. To illustrate, the one or more options may include requesting a more recent version of software release 350 from server 340, rolling back software release 350 to a previous software release, or updating or reapplying for a license associated with software release 350 (or an artifact thereof), as non-limiting examples. Notification 514 may be sent to node devices that are capable of receiving user input to select between the one or more options. Additionally, or alternatively, notification 514 may be sent to users of one or more node devices. For other node devices, other corrective actions, such as transmitting previous release 510 of the software release or second software release 512 may be performed.

In another particular implementation, the vulnerability corresponds to an expired license. In such implementations, initiating corrective action 354 may include transmitting a message (e.g., an electronic message, a text message, an e-mail, etc.) from server 340 to a user of entity device 310 indicating that the license has expired and requires renewal. Additionally, or alternatively, initiating corrective action 354 may include sending instructions to node device 360 (and other node devices) to disable functionality corresponding to the expired license until the license is renewed. Alternatively, server 340 may debit an account of a user of entity device 310 and automatically renew the license as corrective action 354 and/or send a message (e.g., via email, text, etc.) to the user to inform the user that the license is expired.

In some implementations, the risk posed by the particular file is associated with a threat level 506. For example, threat level 506 may be between 1 (lowest) and 10 (highest). In other implementations, other threat levels are used. In some implementations, various ranges of threat levels may correspond to designations of threats. For example, levels 1-3 may correspond to low level threats (e.g., expiration of a renewable license), levels 4-6 may correspond to mid level threats (e.g., failure to complete a development stage of a development process), and levels 7-10 may correspond to high level threats (e.g., .presence of a known vulnerability in one or more files). In some implementations, that action performed as corrective action 354 may correspond to the threat level 506. For example, if threat level 506 is within the first range, initiating corrective action 354 may include transmitting a notification to entity device 310. As another example, if threat level 506 is within the third range, initiating corrective action 354 may include transmitting new software release 512 without requesting action from entity device 310.

In yet another implementation, a method for tracking software releases is described. The method includes initiating transmission of a software release (e.g., 350) to a node device (e.g., 360). The software release includes one or more files (e.g., 346) selected by an entity device (e.g., 310). The method includes maintaining a transaction log (e.g., 116)

based on transmitting the software release. The transaction log indicates software releases deployed to one or more node devices. The method includes identifying vulnerability information (e.g., 118). The method includes analyzing the one or more files based on the vulnerability information to identify a particular file of the one or more files that poses a risk. The method includes identifying, based on the transaction log, a set of node devices (e.g., 348) at which the particular file is deployed. The method further includes initiating, based on identifying the set of node devices, transmission of a corrective action (e.g., 354) to the set of node devices. The corrective action is responsive to the particular file failing the analysis.

Thus, FIG. 5 describes corrective actions that can be performed by server 340 to account for an identified vulnerability in at least one file. The corrective actions can include requesting input from a user of entity device 310 or automatically initiating a corrective action, based on a threat level associated with the vulnerability. Thus, the system (e.g., 500) quickly and effectively initiates corrective actions in response to detection of vulnerabilities.

Figure 6:
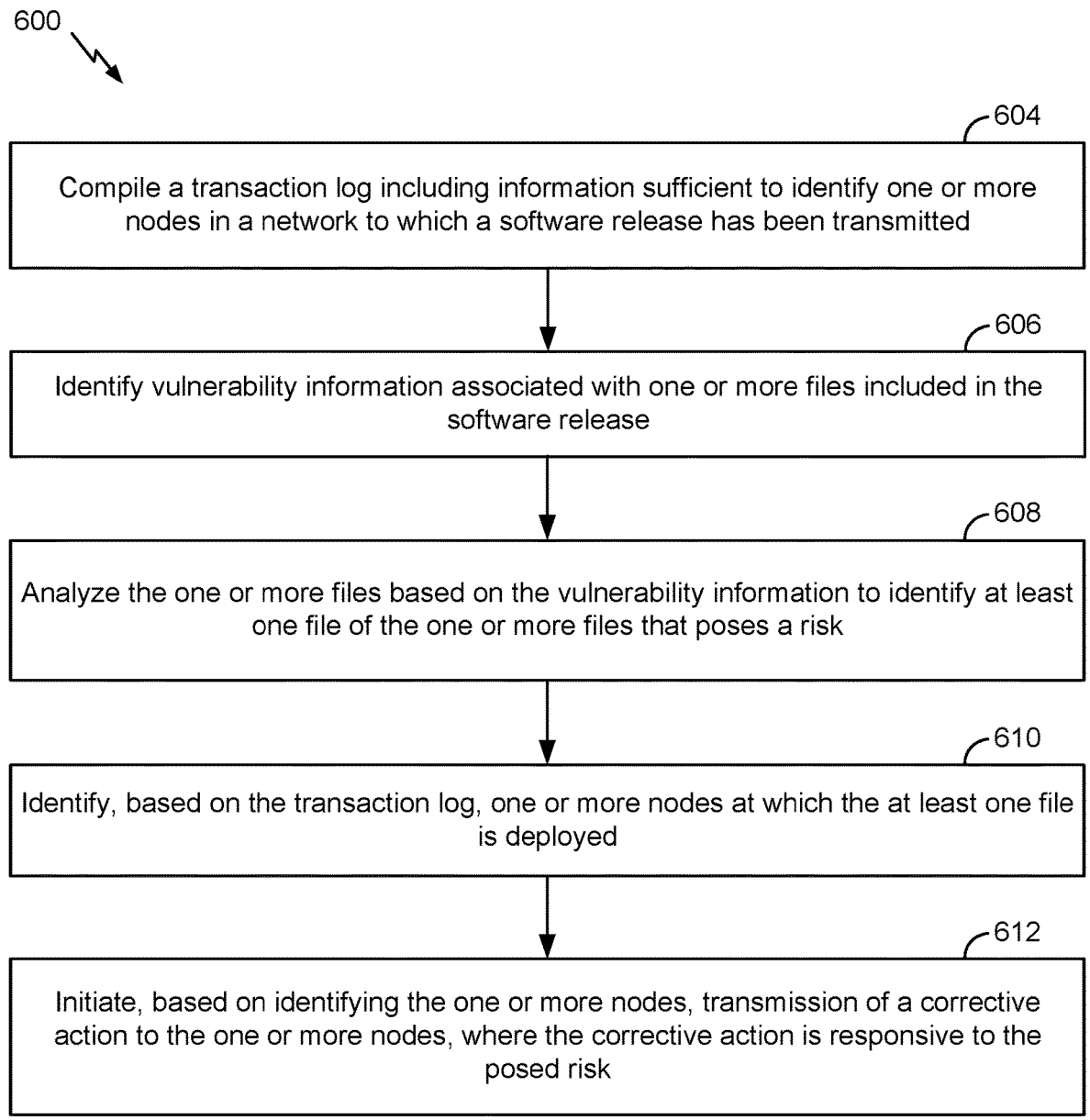
FIG. 6 is a flow diagram of an example of a method for a software release.

FIG. 6 is flow diagram of a method of securely updating a software release across a network. The method of FIG. 6 may be stored in a computer-readable storage medium as instructions that, when executed by one or more processors, cause the one or more processors to perform the operations of the method (e.g., 600).

Referring to FIG. 6, a flow diagram of a method for securely updating a software release across a network according to an embodiment is shown as a method 600. In a particular implementation, method 600 may be performed by server 110, 168 (e.g., one or more processors 250, 342, tracker 256, and/or analyzer 258), and/or server 340.

At 602, method 600 includes compiling a transaction log including information sufficient to identify one or more nodes in a network to which a software release has been transmitted. For example, server 340 may compile transaction log 116.

At 604, method 600 includes identifying vulnerability information associated with one or more files included in the software release. For example, server 340 may identify (or receive) vulnerability information 118.

At 606, method 600 includes analyzing the one or more files based on the vulnerability information to identify at least one file of the one or more files that poses a risk. For example, server 340 (e.g., analyzer 258) may analyze files 346 to identify at least one file that poses a risk.

At 608, method 600 includes identifying, based on the transaction log, one or more nodes at which the at least one file file is deployed. For example, server 340 may identify one or more nodes 348 (including node device 360) as having the at least one file.

At 610, method 600 further includes initiating, based on identifying the one or more nodes, transmission of a corrective action to the one or more nodes. The corrective action is responsive to the posed risk. For example, server 340 may initiate corrective action 354 to node device 360 (and/or other node devices of one or more nodes 348) responsive to the posed risk.

In a particular implementation, method 600 also includes receiving a confirmation from the one or more nodes. The confirmation indicates acceptance of the software release at the one or more nodes. For example, server 340 may receive confirmation 356 from node device 360. Additionally, or alternatively, the transaction log may record release information associated with the software release. For example, transaction log 400 may include release information (e.g., checksums), as further described with reference to FIGS. 4A-4B. In some such implementations, the release information includes, for each of the one or more files, a corresponding checksum, a bundle checksum for an entirety of the one or more files, and/or metadata associated with the software release, as further described with reference to FIGS. 4A-4B.

In a particular implementation, compiling the transaction log includes generating a first entry in the transaction log corresponding to the software release. For example, server 340 may generate first entry 402 in transaction log 400. In some such implementations, the first entry includes a software release identifier corresponding to the software release, a version number corresponding to the software release, release information corresponding to the software release, a time corresponding to the software release, a set of target nodes corresponding to the software release, a set of nodes that received the software release, a set of nodes that failed to receive the software release, a set of nodes operating the software release, or any combination thereof, as described with reference to FIG. 4A. Additionally, or alternatively, the transaction log may include one or more data structures. In some such implementations, the one or more data structures includes a software release log, a node log, and an artifact version log. For example, transaction log 410 may include deployed software release log 412, node log 414, and artifact version log 416.

In another particular implementation, method 600 also includes initiating transmission of a notification to an entity. For example, server 340 may transmit notification 332 to entity device 310. In some such implementations, the notification includes a recommendation, the recommendation including one or more options for the corrective action. For example, notification 332 may include recommendation 334 of one or more options for corrective action 354. In some such implementations, method 600 further includes receiving an instruction from the entity, the instruction indicating the corrective action. For example, server 340 may receive instruction 336 from entity device 310. Instruction 336 may indicate corrective action 354.

In a particular implementation, method 600 also includes receiving a second software release from an entity. In some such implementations, method 600 includes initiating transmission of the second software release to a plurality of nodes. For example, server 340 may receive a second software release from entity device 310 and may transmit the second software release to node device 360. In some such implementations, method 600 further includes compiling the transaction log based on the second software release. Compiling the transaction log based on the second software release may include generating an entry corresponding to the second software release and updating metadata corresponding to an entry of a third software release to indicate that the second software release is a most recently released version. The third software release is transmitted before the second software release. For example, transaction log 116 may indicate that a particular software release is the released version. In response to receiving the second software release, transaction log 116 may be updated such that metadata corresponding to the particular software release no long indicates the particular software release as the released version.

In a particular implementation, method 600 also includes receiving additional vulnerability information from a data source and combining the additional vulnerability information with the vulnerability information. For example, server 340 may receive additional vulnerability information 504 from data source 502 and may combine additional vulnerability information 504 with vulnerability information 118.

In a particular implementation, the vulnerability information includes one or more checksums. Additionally, or alternatively, the vulnerability information includes license information. For example, vulnerability information 118 may include checksums, license information, or a combination thereof.

In a particular implementation, transmitting the corrective action includes transmitting a previous version of the software release, the previous version lacking the at least one file. For example, server 340 may perform corrective action 354 by transmitting previous software release 510 to node device 360. Additionally, or alternatively, transmitting the corrective action may include transmitting the software release to a node that is identified to be executing a previous version of the software release that includes the at least one file. For example, server 340 may perform corrective action 354 by transmitting software release 350 to a node device that is executing previous software release 510. Additionally, or alternatively, transmitting the correction action may include generating a new version of the software release that does not include the at least one file and transmitting the new version of the software release to the one or more nodes. For example, server 340 may perform corrective action 354 by generating and transmitting second software release 512 to node device 360 (and/or others of one or more nodes 348).

In a particular implementation, method 600 also includes, responsive to determining that the at least one file poses the risk, analyzing one or more previous version of the at least one file to determine whether the one or more previous versions of the at least one file pose the risk. For example, server 340 (e.g., analyzer 258) may analyze one or more previous versions of at least one file of files 346 to determine whether the one or more previous versions of the at least one file pose the risk. In some such implementations, method 600 may further include, responsive to determining that the previous versions of the at least one file do not pose the risk, initiating transmission of a second software release that includes the previous versions of the at least one file.

In a particular implementation, analyzing the one or more files is performed based on detection of a vulnerability-related event. The vulnerability-related event includes receipt of additional vulnerability information, detection of a change in a license, or a combination thereof. For example, server 340 (e.g., analyzer 258) may analyze files 346 based on receipt of additional vulnerability information 504, detection of a change in a license associated with vulnerability information 118, or a combination thereof. Additionally, or alternatively, analyzing the one or more files is performed periodically or upon receipt of a request from an entity. For example, server 340 (e.g., analyzer 258) may analyze files 346 periodically or upon receipt of a request from entity device 310.

In a particular implementation, the risk is associated with a threat level, the threat level is within a first range of multiple threat level ranges, and transmitting the corrective action includes transmitting a notification to an entity. For example, server 340 may determine that the risk is associated with a threat level within a first range (e.g., a low range) of threat levels 506 and, based on the determination, may transmit a notification to entity device 310. Additionally, or alternatively, the risk is associated with a threat level, the threat level is within a second range of multiple threat levels, and transmitting the corrective action includes transmitting a new version of the software release without requesting action from an entity. For example, server 340 may determine that the risk is associated with a threat level within a second range (e.g., a high range) of threat levels 506 and, based on the determination, server 340 may transmit second software release 512 to node device 360 without requesting action from entity device 310.

In a particular implementation, transmitting the corrective action includes transmitting a notification to the one or more nodes. The notification indicates one or more options. For example, server 340 may perform corrective action 354 by transmitting notification 514 to node device 360. Notification 514 may include one or more options to be performed at node device 360, such as downloading a new version of a software release, rolling back to a previous version of a software release, etc.

Thus, method 600 describes securely updating a software release in response to detection of a vulnerability. For example, through use of a transaction log that includes information used to track the deployment of software releases throughout a network, the method quickly and easily assess the scope of the vulnerability and to performs a corrective action. Thus, personnel required to perform risk analysis and determine what actions to take may be reduced due to the operations of the method 600.

The method of FIG. 6 may be stored in a computer-readable storage medium as instructions that, when executed by one or more processors, cause the one or more processors to perform the operations of the method (e.g., 600). In some such implementations, method(s) also includes generating one or more graphical user interfaces (GUIs) via which the options for corrective actions, the identification of the particular file that poses the risk, the risk posed by the particular file, or a combination thereof, are displayed.

In some aspects, techniques for supporting secure updating a software release across a network may include additional aspects, such as any single aspect or any combination of aspects described below or in connection with one or more other processes or devices described elsewhere herein. In some aspects, supporting secure updating a software release across a network may include a system configured to compile a transaction log including information sufficient to identify one or more nodes in a network to which a software release has been transmitted, and identify vulnerability information associated with one or more files including the software release. The system is also configured to analyze the one or more files based on the vulnerability information to identify at least one file of the one or more files that poses a risk, and identify, based on the transaction log, one or more nodes at which the at least one file is deployed. The system is further configured to initiate, based on identification of the one or more nodes, transmission of a corrective action to the one or more nodes. The corrective action is responsive to the posed risk. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the processor. The processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a first aspect, the system is further configured to receive a confirmation from the one or more nodes. In some implementations, the confirmation indicates acceptance of the software release at the one or more nodes.

In a second aspect, alone or in combination with the first aspect, the transaction log records release information is associated with the software release.

In a third aspect, in combination with the second aspect, the release information includes, for at least one of the one or more files, a corresponding checksum.

In a fourth aspect, in combination with the third aspect, a bundle checksum for an entirety of the one or more files.

In a fifth aspect, in combination with the fourth aspect, metadata associated with the software release.

In a sixth aspect, alone or in combination with one or more of the first through fifth aspects, to compile the transaction log, the system is further configured to generate a first entry in the transaction log corresponding to the software release.

In a seventh aspect, in combination with the sixth aspect, the first entry includes a software release identifier corresponding to the software release, a version number corresponding to the software release, release information corresponding to the software release, a time corresponding to the software release, a set of target nodes corresponding to the software release, a set of nodes that received the software release, a set of nodes that failed to receive the software release, a set of nodes operating the software release, or any combination thereof.

In an eighth aspect, alone or in combination with one or more of the first through seventh aspects, the transaction log includes one or more data structures.

In a ninth aspect, alone or in combination with one or more of the first through eighth aspects, the one or more data structures includes a software release log, a node log, and an artifact version log.

In a tenth aspect, alone or in combination with one or more of the first through ninth aspects, the system is further configured to initiate transmission of a notification to an entity.

In an eleventh aspect, in combination with the tenth aspect, the notification includes a recommendation.

In a twelfth aspect, in combination with the eleventh aspect, the recommendation includes one or more options for the corrective action.

In a thirteenth aspect, in combination with the tenth aspect, the system is further configured to receive an instruction from the entity, the instruction indicating the corrective action.

In a fourteenth aspect, alone or in combination with one or more of the first through thirteenth aspects, the system is further configured to receive a second software release from an entity.

In a fifteenth aspect, in combination with the fourteenth aspect, the system is further configured to initiate transmission of the second software release to a plurality of nodes.

In a sixteenth aspect, in combination with the fourteenth aspect, the system is further configured to compile the transaction log based on the second software release.

In a seventeenth aspect, in combination with the sixteenth aspect, to compiling the transaction log based on the second software release, the system is further configured to generate an entry corresponding to the second software release.

In an eighteenth aspect, in combination with the seventeenth aspect, the system is further configured to update metadata corresponding to an entry of a third software release to indicate that the second software release is a most recently released version.

In a nineteenth aspect, in combination with the eighteenth aspect, the third software release is transmitted before the second software release.

In a twentieth aspect, alone or in combination with one or more of the first through nineteenth aspects, the system is further configured to receive additional vulnerability information from a data source.

In a twenty-first aspect, in combination with the twentieth aspect, the system is further configured to combine the additional vulnerability information with the vulnerability information.

In a twenty-second aspect, alone or in combination with one or more of the first through twentieth aspects, the vulnerability information includes one or more checksums.

In a twenty-third aspect, alone or in combination with one or more of the first through twentieth aspects, the vulnerability information includes license information.

In a twenty-fourth aspect, alone or in combination with one or more of the first through twenty-third aspects, to transmit the corrective action, the system is further configured to transmit a previous version of the software release.

In a twenty-fifth aspect, in combination with the twenty-fourth aspect, the previous version lacks the at least one file.

In a twenty-sixth aspect, alone or in combination with one or more of the first through twenty-fifth aspects, to transmit the corrective action, the system is further configured to transmit the software release to a node that is identified to be executing a previous version of the software release that includes the at least one file.

In a twenty-seventh aspect, alone or in combination with one or more of the first through twenty-sixth aspects, to transmit the corrective action, the system is further configured to generate a new version of the software release that does not include the at least one file.

In a twenty-eighth aspect, in combination with the twenty-seventh aspect, to transmit the corrective action, the system is further configured to transmit the new version of the software release to the one or more nodes.

In a twenty-ninth aspect, alone or in combination with one or more of the first through twenty-eighth aspects, responsive to a determination that the at least one file poses the risk, the system is further configured to analyze one or more previous versions of the at least one file to determine whether the one or more previous versions of the at least one file pose the risk.

In a thirtieth aspect, in combination with the twenty-ninth aspect, responsive to a determination that the previous versions of the at least one file do not pose the risk, the system is further configured to initiate transmission of a second software release that includes the previous versions of the at least one file.

In a thirty-first aspect, alone or in combination with one or more of the first through thirtieth aspects, the one or more files are analyzed based on detection of a vulnerability-related event.

In a thirty-second aspect, in combination with the thirty-first aspect, the vulnerability-related event includes receipt of additional vulnerability information, detection of a change in a license, or a combination thereof.

In a thirty-third aspect, alone or in combination with one or more of the first through thirtieth aspects, the one or more files is analyzed performed periodically or upon receipt of a request from an entity.

In a thirty-fourth aspect, alone or in combination with one or more of the first through thirtieth aspects, the risk is associated with a threat level.

In a thirty-fifth aspect, in combination with the thirty-third aspect, the threat level is within a first range of multiple threat level ranges.

In a thirty-sixth aspect, in combination with the thirty-fifth aspect, to transmit the corrective action, the system is further configured to transmit a notification to an entity.

In a thirty-seventh aspect, alone or in combination with one or more of the first through thirtieth aspects, the risk is associated with a threat level.

In a thirty-eighth aspect, in combination with the thirty-seventh aspect, the threat level is within a second range of multiple threat level ranges.

In a thirty-ninth aspect, in combination with the thirty-eighth aspect, to transmit the corrective action, the system is further configured to transmit a new version of the software release without requesting action from an entity.

In a fortieth aspect, alone or in combination with one or more of the first through thirty-ninth aspects, to transmit the corrective action, the system is further configured to transmit a notification to the one or more nodes.

In a forty-first aspect, in combination with the fortieth aspect, the notification indicates one or more options.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for securely updating a software release across a network, the method comprising:
   compiling, by one or more processors, a transaction log comprising a first entry including information sufficient to identify at least one node in a network to which a first software release has been transmitted;
   initiating, by the one or more processors, transmission of a second software release to the at least one node;
   updating, by the one or more processors, metadata corresponding to the first entry in the transaction log to indicate that the second software release is a most recently released version of the first software release;
   analyzing, by the one or more processors, one or more files comprising the second software release based on vulnerability information associated with the second software release to identify at least one file of the one or more files that poses a risk; and
   initiating, by the one or more processors and based on identification, using the transaction log, of one or more nodes at which the at least one file is deployed, transmission of a corrective action to the one or more nodes, where the corrective action is responsive to the posed risk.

2. The method of claim 1, where the first entry in the transaction log indicates a set of nodes that received the first software release and a set of nodes that failed to receive the software release.

3. The method of claim 1, where the vulnerability information comprises an indication that at least one of the one or more files failed to complete one or more development stages of a development process of the software release.

4. The method of claim 1, further comprising identifying, by the one or more processors, the vulnerability information associated with the second software release.

5. The method of claim 1, further comprising receiving, by the one or more processors, a confirmation from the at least one node, the confirmation indicating acceptance of the second software release at the at least one node.

6. The method of claim 1, where the transaction log records release information associated with the first software release and the second software release, the release information comprises:
   for at least one of the one or more files, a corresponding checksum;
   a bundle checksum for an entirety of the one or more files; and
   metadata associated with the second software release.

7. The method of claim 1, where compiling the transaction log comprises generating the first entry in the transaction log corresponding to the first software release, the first entry comprising a software release identifier corresponding to the first software release, a version number corresponding to the first software release, release information corresponding to the first software release, a time corresponding to the first software release, a set of target nodes corresponding to the first software release, a set of nodes that received the first software release, a set of nodes that failed to receive the first software release, a set of nodes operating the first software release, or any combination thereof.

8. The method of claim 1, where compiling the transaction log comprises generating a second entry in the transaction log corresponding to the second software release, the second entry comprising a software release identifier corresponding to the second software release, a version number corresponding to the second software release, release information corresponding to the second software release, a time corresponding to the second software release, a set of target nodes corresponding to the second software release, a set of nodes that received the second software release, a set of nodes that failed to receive the second software release, a set of nodes operating the second software release, or any combination thereof.

9. The method of claim 1, where the transaction log comprises one or more data structures, the one or more data structures comprise a software release log, a node log, and an artifact version log.

10. The method of claim 1, further comprising initiating, by the one or more processors, transmission of a notification to an entity, where the notification includes a recommendation, the recommendation including one or more options for the corrective action.

11. The method of claim 10, further comprising receiving, by the one or more processors, an instruction from the entity, the instruction indicating the corrective action.

12. The method of claim 1, further comprising receiving, by the one or more processors, the second software release from an entity.

13. The method of claim 1, further comprising:
  receiving, by the one or more processors, additional vulnerability information from a third-party data source; and
  combining, by the one or more processors, the additional vulnerability information with the vulnerability information,
  where analyzing the one or more files is performed in response to combining the additional vulnerability information with the vulnerability information.

14. A system for securely updating a software release across a network, the system comprising:
  at least one memory storing instructions; and
  one or more processors coupled to the at least one memory, the one or more processors configured to execute the instructions to cause the processor to:
    compile a transaction log comprising a first entry including information sufficient to identify at least one node in a network to which a first software release has been transmitted;
    initiate transmission of a second software release to the at least one node;
    update metadata corresponding to the first entry in the transaction log to indicate that the second software release is a most recently released version of the first software release;
    analyze one or more files comprising the second software release based on vulnerability information associated with the second software release to identify at least one file of the one or more files that poses a risk; and
    initiate, based on identification, using the transaction log, of one or more nodes at which the at least one file is deployed, transmission of a corrective action to the one or more nodes, where the corrective action is responsive to the posed risk.

15. The system of claim 14, where the vulnerability information comprises one or more checksums and license information.

16. The system of claim 14, where transmitting the corrective action comprises transmitting the first software release, the first software release lacking the at least one file.

17. The system of claim 14, where transmitting the corrective action comprises transmitting the second software release to a node that is identified to be executing the first software release that includes the at least one file.

18. The system of claim 14, where transmitting the corrective action comprises:
  generating a new version of the second software release that does not include the at least one file; and
  transmitting the new version of the second software release to the one or more nodes.

19. The system of claim 14, where the one or more processors are further configured to:
  responsive to determining that the at least one file poses the risk, analyze one or more previous versions of the at least one file to determine whether the one or more previous versions of the at least one file pose the risk; and
  responsive to determining that the previous versions of the at least one file do not pose the risk, initiate transmission of a third software release that includes the previous versions of the at least one file.

20. A non-transitory computer-readable storage medium storing instructions that, when executed by one or more processors, cause the one or more processors to perform operations for securely updating a software release across a network, the operations comprising:
  executing a first routine to compile a transaction log comprising a first entry including information sufficient to identify at least one node in a network to which a first software release has been transmitted;
  executing a second routine to initiate transmission of a second software release to the at least one node;
  executing a third routine to update metadata corresponding to the first entry in the transaction log to indicate that the second software release is a most recently released version of the first software release;
  executing a fourth routine to analyze one or more files comprising the second software release based on vulnerability information associated with the second software release to identify at least one file of the one or more files that poses a risk; and
  executing a fifth routine to initiate, based on identification, using the transaction log, of one or more nodes at which the at least one file is deployed, transmission of a corrective action to the one or more nodes, where the corrective action is responsive to the posed risk.

21. The non-transitory computer-readable storage medium of claim 20, where analyzing the one or more files is performed based on detection of a vulnerability-related event, the vulnerability-related event comprising receipt of additional vulnerability information, detection of a change in a license, or a combination thereof.

22. The non-transitory computer-readable storage medium of claim 20, where analyzing the one or more files is performed periodically or upon receipt of a request from an entity.

23. The non-transitory computer-readable storage medium of claim 20, where transmitting the corrective action comprises transmitting a notification to the one or more nodes, the notification indicating one or more options.

\* \* \* \* \*

UNITED STATES PATENT AND TRADEMARK OFFICE
CERTIFICATE OF CORRECTION

| | | |
|---|---|---|
| PATENT NO. | : 11,533,331 B2 | Page 1 of 1 |
| APPLICATION NO. | : 17/227069 | |
| DATED | : December 20, 2022 | |
| INVENTOR(S) | : Yoav Landman | |

It is certified that error appears in the above-identified patent and that said Letters Patent is hereby corrected as shown below:

In the Specification

At Column 9, Line number 1, delete "interne" and replace with --internet--.
At Column 14, Line number 48, delete "furtherherein" and replace with --further herein--.
At Column 16, Line number 22, delete "sewer 110" and replace with --server 110--.
At Column 16, Line number 23, delete "sewer 168" and replace with --server 168--.
At Column 16, Line number 60, delete "tacker 256" and replace with --tracker 256--.

Signed and Sealed this
Twenty-eighth Day of February, 2023

*Katherine Kelly Vidal*

Katherine Kelly Vidal
*Director of the United States Patent and Trademark Office*